United States Patent
Goldmacher et al.

[15] 3,703,331
[45] Nov. 21, 1972

[54] LIQUID CRYSTAL DISPLAY ELEMENT HAVING STORAGE

[72] Inventors: Joel E. Goldmacher, Trenton, N.J.; George H. Heilmeier, Alexandria, Va.

[73] Assignee: RCA Corporation, New York, N.Y.

[22] Filed: Nov. 26, 1971

[21] Appl. No.: 202,580

Related U.S. Application Data

[63] Continuation of Ser. No. 690,309, Dec. 13, 1967, abandoned.

[52] U.S. Cl.........350/160 LC, 252/408, 340/173 LT
[51] Int. Cl................................................G02f 1/16
[58] Field of Search...............350/160 LC; 252/408; 340/173 LT

[56] References Cited

UNITED STATES PATENTS 3,540,796  11/1970  Goldmacher et al......350/160

*Primary Examiner*—Ronald L. Wibert
*Assistant Examiner*—Edward S. Bauer
*Attorney*—G. H. Bruestle

[57] ABSTRACT

A liquid crystal element exhibiting storage of its light scattering state after removal of the electric current initiating the state comprises a mixture of cholesterol, a cholesterol derivative or a cholesteric liquid crystal compound with a nematic liquid crystal of the type that exhibits non-destructive turbulent motion when an electrical current of sufficient magnitude is passed therethrough.

10 Claims, 4 Drawing Figures

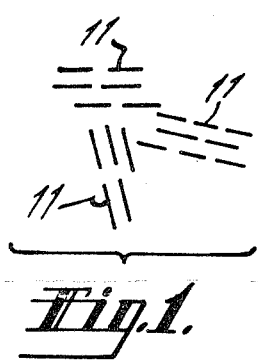
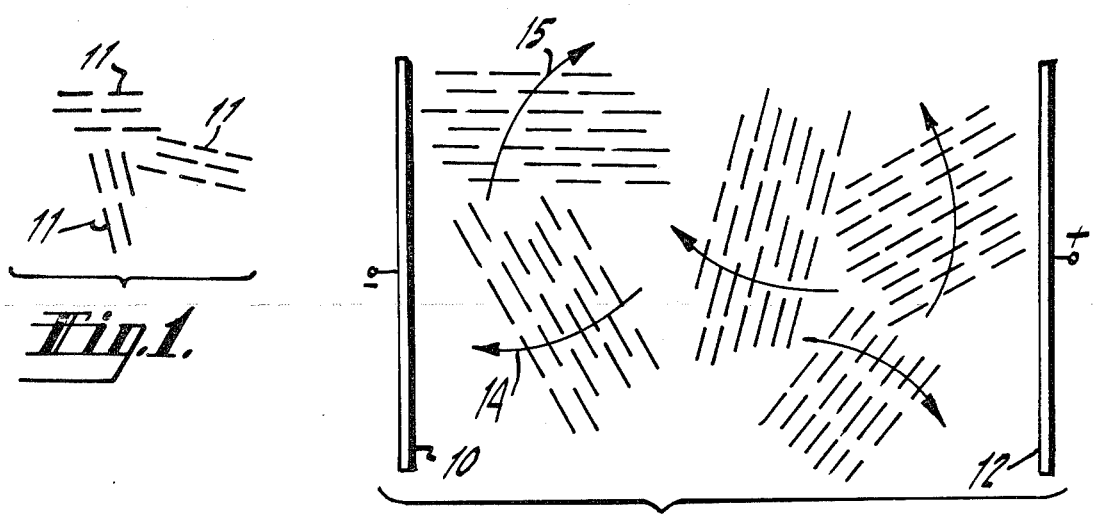
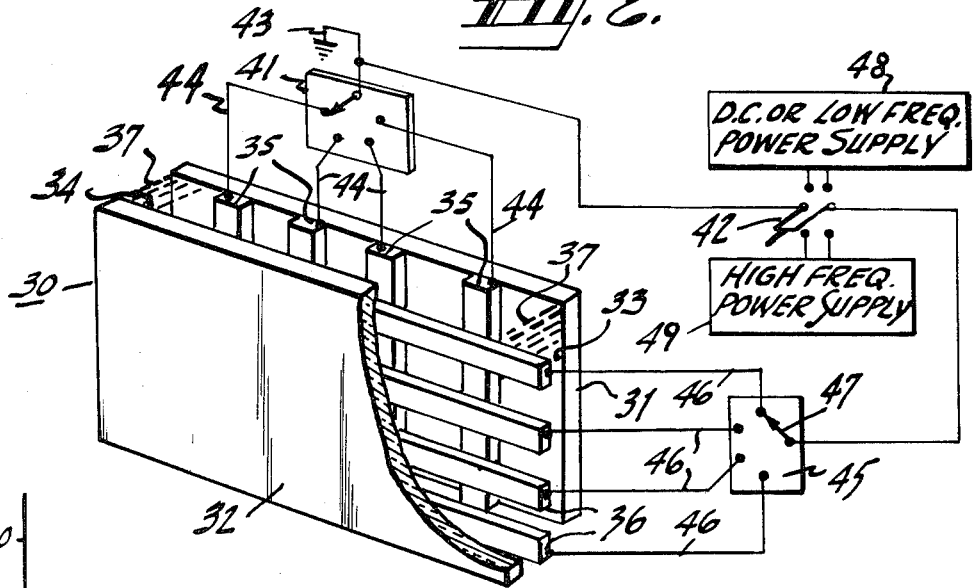
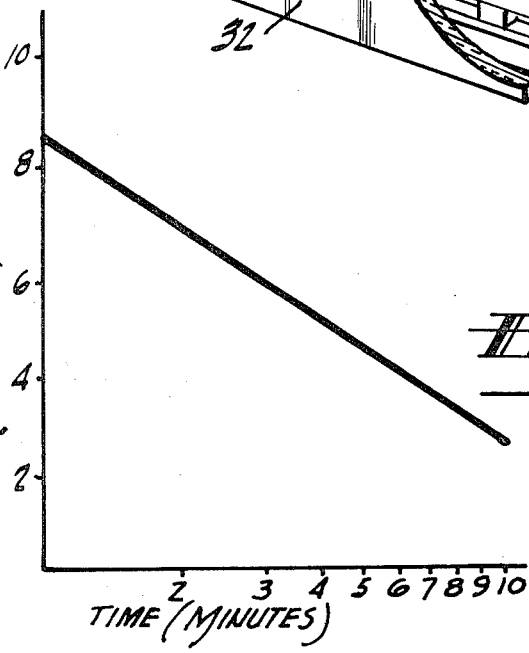
INVENTORS
Joel E. Goldmacher &
George H. Heilmeier
BY
ATTORNEY

LIQUID CRYSTAL DISPLAY ELEMENT HAVING STORAGE

CROSS REFERENCE

This application is a continuation of application Ser. No. 690,309 filed Dec. 13, 1967, now abandoned.

BACKGROUND OF THE INVENTION

This invention relates to electro-optic light scattering devices and particularly to liquid crystal devices having storage capabilities.

Nematic liquid crystals are described in copending applications Electro-Optical Device, Ser. No. 627,515, filed Mar. 31, 1967 by George H. Heilmeier and Louis A. Zanoni, now U.S. Pat. No. 3,499,112 and Electro-Optical Compositions and Devices, Ser. No. 627,451, filed Mar. 31, 1967 by Joel E. Goldmacher and Joseph A. Castellano, now U.S. Pat. No. 3,540,796. Such crystals when in an unexcited state, are relatively transparent to light and, when in an excited state, scatter light. In the crystals described in these applications, the light scattering, termed "dynamic scattering," results from turbulence developed in the liquid crystal at the region at which it is excited.

The dynamic scattering exhibited by liquid crystals may be employed in reflective, absorptive and transmission type flat panel displays, in light shutters and for other applications. The recovery time of the liquid crystal, after it is excited is generally less than 1 second and usually in the order of 0.1 second or less. This is a disadvantage in applications where one desires a long recovery time before returning to a transparent state. For example, in information storage, mapping, and other display systems where one wants the information to remain for a considerable length of time, this invention provides a liquid crystal display element having storage.

SUMMARY OF THE INVENTION

A light scattering device comprises a substantially transparent liquid mixture and voltage means coupled to the mixture for causing it to form a highly light-scattering state. The device is characterized in that the light-scattering state remains for a substantial period of time after the removal of the voltage means. The light scattering state is an emulsion-like state.

BRIEF DESCRIPTION OF THE DRAWING

FIG. 1 is a schematic showing of a liquid crystal in its unexcited state;

FIG. 2 is a schematic showing of a liquid crystal in its excited state;

FIG. 3 is a perspective, partially cut away view of an electro-optical device embodying the invention;

FIG. 4 is a graph, showing the rate of decay of brightness due to scattering, of a liquid crystal element embodying the invention.

DETAILED DESCRIPTION OF THE INVENTION

In a nematic liquid crystal of the type discussed in detail in the aforementioned copending applications, liquid crystal molecules having negative dielectric anisotropy 11 are arranged in the manner shown in FIG. 1 when in their mesomorphic state. As contrasted to ordinary liquids wherein the molecules assume essentially completely random orientations, small groups of the molecules may be in alignment with one another. These groups may be termed domains. The orientations of the domains relative to one another is random and in view of the fact that the number of molecules in each domain is relatively small, the liquid crystal appears to be relatively transparent. This is termed their unexcited state.

In the use of a nematic liquid crystal in display and other applications, the crystal is located between two conducting elements, shown schematically at 10 and 12 in FIG. 2, and a current is injected into the liquid crystal at a field greater than the dynamic scattering threshold electric field of the crystal. This applied electric field causes a number of the domains of FIG. 1 to become aligned so that each domain becomes relatively large. While it may appear that the electric field also should align the relatively large domains with one another, it has been discovered that when the liquid crystal is operated in this manner, the domains exhibit turbulent motion, as indicated schematically by the arrows such as 14 and 15. This is termed their excited state. The effect on the eye of such movement is that of scattering light which is incident on the liquid crystal. Contrast ratios due to such scattering of more than 10 to 1 have been observed. In other words, the brightness of scattered light from a thin film of liquid crystal in the presence of incident light (this normally is unpolarized light) may be more than 10 times greater during the time the domains are in a turbulent state as shown in FIG. 2 than during the time the liquid crystal is in an unexcited state as shown in FIG. 1. Generally, the liquid crystals relax to their unexcited state within about 100 milliseconds after the removal of the exciting electric field.

In practice, a liquid crystal display includes two planar elements with a thin liquid film between them. One of the elements may be transparent and the other reflective. Row and column conductors, which may be transparent conductors, may be in contact with the liquid crystal for exciting selected areas of the liquid crystal. Reflective displays as well as displays modulating the transmission or absorption of light can be produced.

We have now discovered that by providing a mixture comprising at least one nematic liquid crystal of the type which exhibits turbulent motion as described above with either cholesterol and/or cholesterol derivatives and/or cholesteric liquid crystals, the time required for the liquid crystal mixture to return to its transparent state can be extended to as much as several weeks or more. This can be employed to give displays having storage. It has additionally been discovered that the mixture can be returned to its transparent state in a matter of milliseconds by the application of a relatively high frequency A. C. field to the liquid crystal mixture. This return to the transparent state is termed erasure.

At the time of filing of the parent patent application, it was believed that in its quiescent or unexcited state the novel liquid crystal mixture consists of an essentially single phase homogeneous molecular solution of guest molecules of a cholesteric liquid crystal, cholesterol or cholesterol derivatives in a host nematic liquid crystal. This single phase molecular solution is essentially transparent. When a D.C. or a low frequency A.C. field which causes an electric current in the mixture is applied thereto the nematic liquid crystals go into turbulent motion as previously described in connection with FIG. 2. It was hypothesized that when this happens the single phase molecular solution of the guest molecules in the nematic host separates into two separate phases, a nematic host phase and a cholesterol or cholesteric guest phase, and the mixture resembles an emulsion. Light scattering at this instant in time was believed to be due to the combined effect of the turbulent motion of the nematic liquid crystal phase and to the passage of incident light through many interfaces of the two separate phases which possess different indices of refraction. When the exciting field is removed the turbulent motion of the nematic crystals ceases and the mixture was believed to remain in a two phase emulsion-like state for a period of time which depends on the particular mixture. The hypothesized retention of this state was thought to result in the continued light scattering after removal of the exciting field. This state is termed the storage state. It was further hypothesized that the application of a relatively high frequency field to the mixture in the storage state breaks down the emulsion and causes the mixture to reform an essentially single phase substantially transparent solution. This explained the erasure feature of the device.

A more recent theory of operation is that the mixture formed from a nematic liquid crystal composition which exhibits dynamic scattering (and therefore possesses a negative dielectric anisotropy) with a cholesteric material, is itself cholesteric and has a negative anisotropy, i.e., the dipoles are perpendicular to the molecular axis. An external field causes these dipoles to turn parallel to the field. When the material is originally in a planar texture, i.e., where the helical cholesteric axes is perpendicular to the plane of the glass, it is optically clear. If the material is in a disrupted state, i.e., the focal-conic texture state, it scatters light and is optically diffuse. The "write" or "-storage" mechanism is believed to rely on the finding that when the frequency of the applied signal is low enough, the transit of ions disrupts the planar texture, converting it to a focal conic texture. The "erase" mechanism is believed to be caused by the high frequency field due to the fact that the ions tend to oscillate rather than be in transit at higher frequencies and the field acts to return the dipoles parallel to the field and reform the planar optically clear texture.

EXAMPLE 1

FIG. 3 is an example of a preferred novel liquid crystal element in the form of a crossed grid optical display device 30. The novel device consists of back and front transparent support plates 31 and 32 respectively. The plates 31 and 32 are parallel and are separated by a distance of about one-fourth mil. On the inner face 33 of the back plate 31 is an array of parallel spaced transparent conductive back electrode strips 35. On the inner surface 34 of the front plate 32 is an array of parallel, spaced transparent conductive strips 36. The front and back conductive strips 35 and 36 are mutually perpendicular.

The space between the front and back plates 31 and 32 is filled with a liquid mixture 37 comprising 80 weight percent of a nematic liquid crystal composition and 20 weight percent of cholesterol derivatives. The nematic composition consists essentially of an equal weight ratio of anisylidene-p-aminophenylacetate, p-n-butoxybenzylidene-p-aminophenylacetate and anisylidene-p-aminophenylbutyrate. The cholesterol derivatives consist essentially of 23 weight percent of cholesteryl chloride and 77 weight percent of cholesteryl oleate. The mixture may be sealed in the device 30 by using epoxy cement around the edges of the device 30.

Also shown in FIG. 3 is a schematic representation of a selection circuit which may be used for operating the novel device. The selection circuit for purposes of this application is illustrated as a group of mechanical switches, the detail of which is given below. As appreciated by those skilled in the art, in practice, electronic switches such as transistors, diodes, or the like, may be used instead. Such circuits are in themselves well known and are therefore not illustrated herein.

The circuit shown includes a back electrode strip commutator switch 41 having its common contact connected to one central terminal of a double pole double throw switch 42 and to ground 43. The commutator contacts of the commutator switch 41 are connected to each of the back electrode strips 35 through connecting leads 44, as shown. A front electrode strip commutator switch 45 is provided which has its commutator contacts connected to the front electrode strips 36 through connecting leads 46, and has its common contact 47 connected to a second central terminal of the double pole double throw switch 42. One set of poles of the double pole double throw switch 42 is connected to a D.C. or a low frequency A.C. power supply 48 used for writing information onto the device 30. The other set of poles of the double pole double throw switch 42 is connected to a high frequency A.C. power supply 49 used for erasing the previously written information. Hence, the power supplies 48 and 49, for writing and erasing, are alternatively serially connected to the display device 30 by the double pole double throw switch 42 through the commutator switches 41 and 45 so as to activate or erase one element at a time of the device 30 depending upon the position of the commutator contacts.

In operation, the device 30 is normally substantially transparent to light incident upon it. By applying a D.C. voltage, of for example 50–100 volts, or a low frequency A.C. voltage, of for example 50–100 volts at 30–120 Hertz, across the intersection of any of the conductive strips 35 and 36, the region of the liquid mixture 37 in this intersection will scatter light incident upon it. Upon removal of the voltage, light will still be scattered in this region until the mixture thermally relaxes and returns to its unexcited state or until a high frequency A.C. voltage of for example 100 volts at 1,200 to 2,000 Hertz is applied to the intersection whereupon the mixture 37 returns to its transparent unexcited state within the order of about 10 milliseconds. Complete thermal relaxation to the transparent state may take several weeks or longer at room temperature. This relaxation time is substantially decreased at increased operating temperatures. After three days at room temperature the contrast ratio of this cell was reduced by about 25 percent.

EXAMPLE 2

In this example, the device 30 or a similar device is comprised of a mixture of the same compounds as described in Example 1 except that the nematic liquid crystal compositions comprises 90 weight percent of the total mixture and the cholesterol derivatives comprise 10 weight percent of the mixture. With this mixture, scattering can be produced with only 35 volts D.C. or 60–110 volts A.C. at 30 Hertz. Erasure of the light scattering can be accomplished with from 60–100 volts A.C. at about 600 Hertz. The contrast ratios between the light scattering region and an adjacent transmitting region is in the order of about 6:1. This value depends on the particular mixture being used and the voltage and temperatures to which it is subjected. The configuration given by way of example it not meant to be limiting and any electro-optic light valve comprising a liquid mixture as taught herein are included in this invention.

Mixtures found useful in the practice of this invention include a nematic liquid crystal composition of the type that exhibits turbulent motion when an above threshold electric current is passed therethrough.

Examples of these materials are alkoxybenzylidene p-aminephenylesters such as p-ethoxybenzylidene-p' aminophenylacetate and aminophenylalkoxy-p-benzylidene esters such as p-aminophenylmethoxy-p'-benzylidenepropionate, and mixtures thereof. Further examples of useful nematic compositions can be found with reference to Table 1. The useful mixtures also include either cholesterol, cholesterol derivatives or cholesteric liquid crystals or mixtures thereof. Any cholesterol derivative and/or any cholesteric liquid crystal can be used. It is preferred that the nematic composition comprise at least 50 weight percent of the total mixture and more preferably from about 75 to 95 weight percent of the mixture.

Cholesterol is represented by the structural formula:

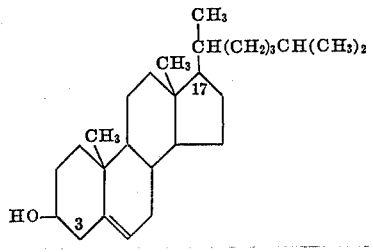

The preferred cholesterol derivatives are those wherein substitutions are made at the 3 and 17 positions. For example, substitution for the OH by; saturated or unsaturated, aliphatic or aromatic esters or ethers, halogens, nitrate, sulfonate, and cinnamate, or substitution of the hydrocarbon chain at the 17 position by modifications in the chain and/or chain length result in preferred cholesterol derivatives. Still other examples of cholesterol derivatives useful herein are cholest-4-en-3-one, cholestanyl-benzoate and stigmasterol derivatives. Examples of useful cholesteric liquid crystals are p-(4-cyanobenzalamino)-cinnamic acid active amyl ester, and p-(4-methoxybenzalamino)-cinnamic acid active amyl ester. Further and more specific examples of cholesterol derivatives and cholesteric liquid crystals useful in the novel device are listed in Table 1.

TABLE 1

COMPOUNDS USEFUL IN THE NOVEL DEVICE

Nematic Liquid Crystals
  p-n-anisylidene-p'-aminophenylacetate
  p-n-butoxybenzoic acid dimer
  p-n butoxybenzylidene-p'-aminophenylacetate
  p-n-octoxybenzylidene-p'-aminophenylacetate
  p-n-benzylideneacetate-p'-aminophenylethoxide
  p-n-anisylidene-p'-aminophenylbutyrate
  p-n-butoxybenzylidene-p'-aminophenylpentanoate
  p-n-hexoxybenzylidene-p'-aminophenylacetate
  p-iso-pentoxybenzylidene-p'-aminophenylacetate
  p-n-benzylidenebutyrate-p'-aminophenylmethoxide
  p-n-benzylidenebutyrate-p'-aminophenylhexoxide
  p-n-nonoxybenzylidene-p'-aminophenylacetate
  p-n-anisylidene-p'-aminophenylpentanoate
  p-n-propoxybenzylidene-p'-aminophenylacetate
  p-n-propoxybenzylidene-p'-aminophenylbutyrate
  p-n benzylidenebutyrate-p'-aminophenylpropoxide
  p-n-benzylideneacetate-p'-aminophenylmethoxide Cholesterol Derivatives and Cholesteric Liquid Crystals
  Stigmasterol
  Cholesteryl Palmitate
  Cholesteryl Decanoate
  Cholesteryl Laurate
  Cholesteryl Propionate
  Cholesteryl Heptafluorobutyrate
  Cholesteryl 2-Furoate
  Cholesteryl Cinnamate
  Cholesteryl Cyclohexanecarboxylate
  Cholesteryl Anisoate
  Dicholesteryl Phthalate
  Cholesteryl p-Nitrobenzoate
  Cholesteryl p-Phenylazobenzoate
  Cholesteryl 3,5-Dinitrobenzoate
  Cholesteryl 2-(Ethoxyethoxy)ethyl Carbonate
  Cholesteryl 2-(2-Methoxyethoxy)ethyl Carbonate
  Cholesteryl Geranyl Carbonate
  Cholesteryl Octadecyl Carbonate
  Cholesteryl 2-Propyn-1-yl Carbonate
  Cholesteryl 2-Methyl-2-propene-1-yl Carbonate
  Allyl Cholesteryl Carbonate
  Cholesteryl 2,2,2-Trifluoroethyl Carbonate
  Cholesteryl Methyl Carbonate
  Cholesteryl Cinnamyl Carbonate
  Cholesteryl p-Menth-1-en-8-yl Carbonate
  Cholesteryl Nitrate
  Cholestanyl Propynyl Carbonate
  $3\beta$-Chlorocholest-5-ene
  Cholesteryl Methanesulfonate
  $5\alpha$-Cholestan-$3\beta$-yl Chloroformate
  Cholesteryl Chloroformate
  $5\alpha$-Cholestan-$3\beta$-ol FIG. 4 is a graph showing the thermal decay of scattering as a function of time after the removal of the voltage which initiated the scattering effect. Brightness due to scattering is plotted as the ordinate in arbitrary units and time in minutes is plotted on the abscissa. A test cell was comprised of parallel glass plates separated by a ½-mil thick layer of a mixture of 10 weight percent cholesteryl nitrate, 30 weight percent anisylidene-p-aminophenylacetate, 30 weight percent p-anisylidene-p-aminophenylbutyrate and 30 weight percent p-n-butoxybenzylidene-p-aminophenylacetate.

The inner face of one glass plate was coated with aluminum and the inner face of the other glass plate was coated with conductive transparent tin oxide. These coatings served as conductive contacts. The cell, maintained at 28°C. was excited to its light scattering state by a D.C. voltage. The voltage was removed shortly thereafter and the brightness of scattered light from the cell was measured as a function of time. The brightness of this particular mixture at 28°C. is shown to be reduced by about 75 percent of its initial brightness in about 10 minutes. If one compares this to the relaxation rate of the mixture of Example 1, it can be seen that the relaxation rate and hence the storage time is greatly dependent upon the particular composition of the mixture.

What is claimed is:

1. A liquid crystal element having storage which comprises a mixture of at least one nematic liquid crystal compound of the formula

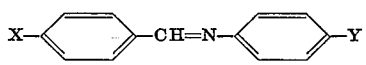

wherein X and Y are selected from the group consisting of alkoxy radicals and acyloxy radicals, said alkoxy radicals having from one to nine carbon atoms and said acyloxy radicals having from two to five carbon atoms, with the proviso that X and Y are different, and when said acyloxy radical has only two carbon atoms, said alkoxy radical has at least three carbon atoms with at least one member of the group consisting of cholesterol derivatives, and means coupled to the mixture for producing a flow of exciting electric current therein.

2. A liquid crystal element according to claim 1 including AC voltage means coupled thereto for erasing images formed on said element.

3. A light scattering device comprising a substantially transparent layer of a liquid crystal mixture of at least one nematic liquid crystal compound having the formula

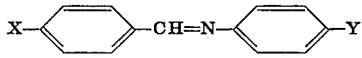

wherein X and Y are selected from the group consisting of alkoxy radicals and acyloxy radicals, said alkoxy radicals having from one to nine carbon atoms and said acyloxy radicals having from two to five carbon atoms, with the proviso that X and Y are different and when said acyloxy radical has only two carbon atoms, said alkoxy radical has at least three carbon atoms, with at least one member of the group consisting of cholesterol derivatives, said liquid crystal mixture being supported between support plates at least one of which is transparent, and electrode means for applying an exciting voltage to said liquid crystal layer.

4. A light scattering device according to claim 3 wherein said mixture contains from 50–95 percent by weight of said nematic liquid crystal component.

5. A light scattering device according to claim 3 wherein said mixture contains from 75–95 percent by weight of said nematic liquid crystal component.

6. The light scattering device recited in claim 3 wherein the nematic liquid crystal component of said mixture comprises at least one member of the group consisting of anisylidene-p-aminophenylacetate, p-butoxy-benzylidene-p'-aminophenylacetate and anisylidene-p-aminophenyl-butyrate.

7. The light scattering device recited in claim 6 wherein the nematic liquid crystals anisylidene-p-aminophenyl-acetate, p-butoxybenzylidene-p'-aminophenylacetate and anisylidene-p-aminophenyl-butyrate are present in equal proportions by weight and wherein these nematic materials comprise between 80 to 90 percent of the total weight of the mixture.

8. The light scattering device recited in claim 3 wherein said cholesterol derivative comprises cholesteryl chloride and cholesteryl oleate in a weight ratio of cholesteryl chloride to cholesteryl oleate of approximately 1:3.

9. A method of operating a liquid crystal device containing a mixture of at least one nematic liquid crystal compound of the formula

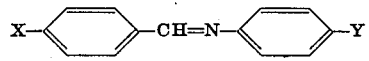

wherein X and Y are selected from the group consisting of alkoxy radicals and acyloxy radicals, said alkoxy radicals having from one to nine carbon atoms and said acyloxy radicals having from two to five carbon atoms, with the proviso that X and Y are different and when said acyloxy radical has only two carbon atoms, said alkoxy radical has at least three carbon atoms, and at least one member of the group consisting of cholesterol derivatives, which comprises a. causing light-scattering in the mixture by passing an exciting electric current through the liquid crystal mixture, said electric current being DC or a first frequency AC;

b. removing said exciting electric current; and c. erasing the scattering and returning the mixture to its original state by applying a second frequency AC electric field to said mixture, said second frequency being substantially higher than said first frequency.

10. A method according to claim 9 wherein said erasing AC field has a frequency of at least about 600 Hz.

* * * * *